(12) United States Patent
Gunton (10) Patent No.: US 12,411,998 B2
(45) Date of Patent: Sep. 9, 2025

(54) SELF-INTERSECTING LATTICE INCARNATION

(71) Applicant: Siemens Industry Software Inc., Plano, TX (US)

(72) Inventor: James Gunton, Cambridge (GB)

(73) Assignee: Siemens Industry Software Inc., Plano, TX (US)

( * ) Notice: Subject to any disclaimer, the term of this patent is extended or adjusted under 35 U.S.C. 154(b) by 1056 days.

(21) Appl. No.: 17/388,771

(22) Filed: Jul. 29, 2021

(65) Prior Publication Data

US 2023/0037000 A1    Feb. 2, 2023

(51) Int. Cl.
*G06F 30/10* (2020.01)
*G06F 30/23* (2020.01)
*G06T 17/10* (2006.01)
*G06T 17/20* (2006.01)

(52) U.S. Cl.
CPC .............. *G06F 30/10* (2020.01); *G06F 30/23* (2020.01); *G06T 17/10* (2013.01); *G06T 17/20* (2013.01)

(58) Field of Classification Search
CPC .......... G06F 30/10; G06F 30/00; G06F 30/23; G06F 30/25; G06F 30/367; G06F 30/398; G06F 2113/10; G06T 17/10; G06T 17/20; B33Y 50/00
See application file for complete search history.

(56) References Cited

U.S. PATENT DOCUMENTS

2013/0060530 A1\* 3/2013 Sen ......................... G06F 30/00
703/1

OTHER PUBLICATIONS

Elber, Gershon. Free form surface analysis using a hybrid of symbolic and numeric computation. Diss. Dept. of Computer Science, University of Utah, 1992. (Year: 1992).\*
Formica, Anna, et al. "A 16-intersection matrix for the polygon-polyline topological relation for geographic pictorial query languages." Multidisciplinary Research and Practice for Information Systems: IFIP WG 8.4, 8.9/TC 5 (Year: 2012).\*
Seong, Joon-Kyung, Elaine Cohen, and Gershon Elber. "Voronoi diagram computations for planar NURBS curves." Proceedings of the 2008 ACM Symposium on solid and physical modeling. 2008. (Year: 2008).\*
Wang, Bolun, et al. "A large-scale benchmark and an inclusion-based algorithm for continuous collision detection." ACM Transactions on Graphics (TOG) 40.5 (2021): 1-16. (Year: 2021).\*
Žalik, Borut. "Two efficient algorithms for determining intersection points between simple polygons." Computers & Geosciences 26.2 (2000): 137-151. (Year: 2000).\*

\* cited by examiner

*Primary Examiner* — Michael Edward Cocchi
(74) *Attorney, Agent, or Firm* — Lempia Summerfield Katz LLC (57) ABSTRACT

A computer-implemented method of incarnating a self-intersecting lattice structure as a mesh in a three-dimensional model is described. A pair of bodies in the lattice is chosen. An initial set of sample points is created by intersecting a set of constant parameter curves within the parameter range lying on the surface of one of the bodies of the pair with the surface of the other body of the pair. Chords between adjacent sample points in the initial set of samples that lie within a pre-determined tolerance of the surfaces of both bodies in the pair are calculated and iterated over until all the sample points are within the pre-determined tolerance. Once this is done for all bodies in the lattice, a mesh is incarnated.

13 Claims, 7 Drawing Sheets

SELF-INTERSECTING LATTICE INCARNATION

TECHNICAL FIELD

The embodiments relate to a computer-implemented method of incarnating a self-intersecting lattice structure as a mesh in a three-dimensional model, in particular, a self-intersecting lattice structure including rod-ball and rod-rod clashes.

BACKGROUND

Computer-Aided Design (CAD) systems are used commonly in many fields of engineering, manufacturing, and design to create and manipulate solid modelling representations of objects, for example, in additive manufacturing. Boundary representation (B-rep) technology dominates CAD modelling. The B-rep technology provides an efficient and adaptable representation of parts by combining classic geometry: analytic surfaces and curves, non-uniform rational basis spline (NURBS) and procedural surfaces and curves; with topology, which captures the connectivity and interaction between geometric elements. Additive manufacturing is the process of creating three-dimensional objects using a three-dimensional printer based on CAD or other digital three-dimensional models. Objects may be scanned as a precursor to creating a CAD model, or may be designed from scratch, and stored in either STL (stereolithography file format) or AMF (additive manufacturing file format) files for future printing. Lattices are a common type of interior space-filler used in additive manufacturing as their lightweight, yet rigid construction makes them ideal for this purpose—the object is strengthened but its mass density remains relatively low. In B-rep (Boundary Representation) modelling, such spaces are enclosed by closed, connected sets of faces, where each face is a portion of a two-dimensional surface. The faces have boundary edges, which are defined by curves where the faces intersect with one another.

One example of an irregular lattice is a set of linear rods connected to each other by spherical balls. The ball radii may be constant across the lattice, or vary across the entire lattice, or a combination of both. Similarly, the rods may vary in thickness linearly along their length. However, both rods and balls may only exist within the lattice in their entirety, meaning that a lattice cannot contain a portion of a ball, and that all rods are terminated by balls.

Typically, within a modelling system, the majority of operations are available when using a mesh structure, but this may be limited when considering a lattice structure. In order to overcome this, it is common practice to convert the lattices used for space filling to meshes (to tolerance) in order to perform certain operations. Meshes are also employed in three-dimensional printing applications, hence lattice conversion is required in additive manufacturing situations. In the case of a non-self-intersecting lattice, typical efficient mesh incarnation employs analytic trimming curves between the rods and the balls to generate a set of boundary polylines for each rod or ball rapidly. The mesh facets are then generated easily for each element from the polyline representation.

However, the analytic curve approach is not suitable for use in self-intersecting lattices, in which rods clash with balls or other rods. The curve of a rod-ball or rod-rod intersection is in general not an analytic curve, and so an alternative mechanism for generating the polylines needs to be used. One common approach is to avoid the problem by using a marching cubes algorithm instead of a trimmed curve algorithm. This extracts a polygonal mesh of an isosurface from a three-dimensional discrete scalar field including a plurality of voxels. Whilst imaging rendering using the marching cubes algorithm is useful in certain applications, the results in terms of mesh incarnation are relatively coarse. The algorithm itself does not take into account any of the underlying geometry of the lattice, and needs to be applied to the entire lattice, as the facets generated are not consistent with those produced by a trimmed curve algorithm. In addition, the computing time required for mesh generation is proportional to the number of cubes required, which in turn is proportional to the cube of the required lattice tolerance. This may result in a lack of accuracy in the generation of mesh vertices unless a long computing time is acceptable. Because a self-intersecting lattice may contain a high number of rod-ball or rod-rod clashes, the efficiency in which these clashes may be resolved has a strong bearing on the performance of mesh incarnation and being able to do this at a reduced computing cost with increased accuracy would be desirable.

SUMMARY

The scope of the present disclosure is defined solely by the appended claims and is not affected to any degree by the statements within this summary. The present embodiments may obviate one or more of the drawbacks or limitations in the related art.

There is provided, in a first aspect, a computer-implemented method of incarnating a self-intersecting lattice structure as a mesh in a three-dimensional model, including: a) selecting an ordered pair of intersecting bodies at a body-body intersection within the self-intersecting lattice, wherein the geometry of the bodies enables the calculation of: i) a constant parameter curve on the surface of the first body capable of intersection with the surface of the second body, and ii) a parameter range over which the body-body intersection exists; b) determining the parameter range on the first body of the pair over which the body-body intersection exists; c) creating an initial set of sample points by intersecting a set of constant parameter curves within the parameter range lying on the surface of the first body of the pair with the surface of the second body of the pair; d) determining whether chords between adjacent sample points in the initial set of samples lie within a pre-determined tolerance of the surfaces of both bodies in the pair; e) iterating over the initial set of sample points and allowing the number of sample points to increase, until converging on a final set of sample points for which the chords between adjacent sample points meet the pre-determined tolerance; f) repeating acts a) to e) for all of the body-body intersections of the self-intersecting lattice; and g) incarnating a mesh representing the self-intersecting lattice including a plurality of polylines generated from the final set of sample points for each body-body intersection.

By combining a sampling algorithm, that enables sample points along an intersection to be dealt with analytically, with an algorithm that is based on the geometry of the lattice itself, the embodiments described herein offer a faster and more accurate mesh incarnation than existing techniques.

One body in the pair may be a ball and the other body in the pair may be a rod, such that the intersection is a rod-ball intersection.

One body in the pair may be a rod and the other body in the pair may also be a rod, such that the intersection is a rod-rod intersection.

The constant parameter curve may be a u parameter curve or a v parameter curve.

If, in acts d) and e), any chordal deviation exceeds the pre-determined tolerance, the method may further include the act of: estimating the number of sub-divisions required for each chord such that the deviation of each chord subdivision lies within the pre-determined tolerance, and, using the total of these values, determining the number of sample points included in the next iteration of act e), and, using the individual values, determining the location of the sample points included in the next iteration of act e).

The number of sample points may be prohibited from decreasing in each successive iteration at act e).

The maximum chordal deviation may be within a fixed threshold of the minimum chordal deviation within the set of sample points.

The sample points in the final set of sample points may lie exactly on the self-intersecting lattice.

The intersection may be a non-analytic curve.

The constant parameter curve on the surface of the first body may be capable of intersection with the surface of the second body at an analytically determinable point. The parameter range over which the body-body intersection exists may also be analytically determinable.

In a second aspect, there is provided a computer program including code, which when executed by a data processing system, causes the data processing system to carry out the acts of any of the method outlined above.

BRIEF DESCRIPTION OF THE DRAWINGS

The present disclosure will now be described by way of example only, and with reference to the accompanying drawings, in which.

DETAILED DESCRIPTION

The embodiments described below deal with the issues surrounding incarnating meshes from self-intersecting lattices by combining a sampling algorithm, that enables sample points along an intersection to be dealt with analytically, with an algorithm that is based on the geometry of the lattice itself. Taking as a basic example a pair of intersecting rods, selected from the lattice, the parameter range on one rod, over which the rod-rod intersection exists, is determined. An initial set of sample points is created by intersecting a set of constant parameter curves within the parameter range lying on the surface of one of the rods of the pair with the surface of the other rod of the pair. The chords between adjacent sample points in the initial set of samples are examined to determine if they lie within a pre-determined tolerance of the surfaces of both rods in the pair. The initial set of sample points is iterated over until converging on a final set of sample points for which the chords between adjacent sample points have a minimum variation from each other. This variation may be negligible. To generate the required polylines to incarnate the mesh, these acts are repeated for all of the rod-rod intersections of the self-intersecting lattice. Finally, a mesh representing the self-intersecting lattice is incarnated from a plurality of polylines generated from the final set of sample points for each rod-rod intersection.

Figure 1:
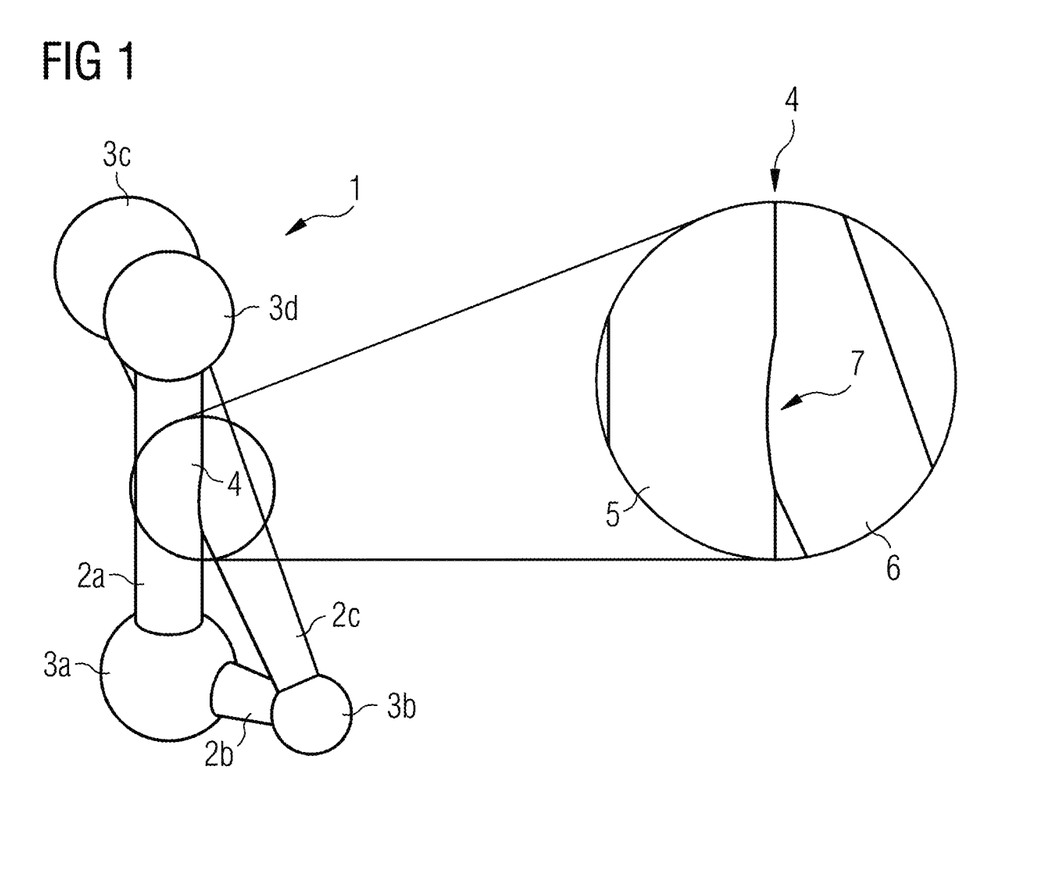
FIG. 1 is a schematic perspective illustration of a portion of a self-intersecting lattice according to an embodiment.

FIG. 1 is a schematic perspective illustration of a portion of a self-intersecting lattice. This illustrates the body-body intersection as a rod-rod intersection. The portion of the self-intersecting lattice 1 shown includes three rods 2a, 2b, 2c linked together by a series of balls 3a, 3b, 3c, 3d. The first rod 2a is linked to the second rod 2b by a ball 3a. The second rod 2b is linked to the third rod 2c by a ball 3b, distal from the first rod 2a. The first 2a rod and third 2c rod intersect at a rod-rod intersection 4. This region is highlighted and enlarged to show the rod-rod intersection 4 in more detail. The surface 5 of the first rod 2a intersects with the surface 6 of the third rod 2c creating an intersection curve 7 that is not analytic.

The rod-rod intersection curve 7 forms the basis of a polyline that will be used to incarnate a triangular mesh representation of the self-intersecting lattice 1. The polylines themselves are created by collecting a sequence of sample points on the intersection curve 7 of the first 2a and third 2c rods. To determine the position of each sample point, a constant parameter curve on the surface 5 of the first rod 2a is intersected with the surface 6 of the third rod 2c. This is illustrated further in FIG. 2a, which is a schematic perspective illustration of a rod-rod intersection. The rod-rod intersection 4 shows a pair of rods 2e, 2f where the first rod 2e of the pair intersects with the second rod 2f of the pair at an intersection curve 7. The sample points 10n are found by taking constant parameter curves 8 lying on the first rod 2e and intersecting them with the surface of the second rod 2f. The curves are taken at various parameters within a parameter range that is calculated analytically as follows. If constant-u parameter curves are being used, and the rod-rod intersection 7 is periodic with respect to the u parameter, then the parameter range is 0 to 2 π radians. Otherwise, if there exist two extreme sample points, 10a, 10b, at which the tangent of the rod-rod intersection 7 has zero component in the chosen parameter direction, their parameters define the parameter range. However, if the rod-rod intersection approaches asymptotes (for example, in the case of two parallel, identical conical rods positioned so that their intersection is hyperbolic), the parameter values of the asymptotes define the parameter range. The choice of a constant-u parameter or a constant-v parameter curve is dependent on the stability of the calculation and the computing time required to solve the analytic intersection points. A predetermined tolerance is set, that specifies how close the polyline resulting from the set of sample points 10n is to the surfaces of the pair of rods 2e, 2f. Chords are produced by joining the sample points 10n together in order from chosen origin, such as the minimum of the parameter range, based on the parameter of the constant parameter curve. If the chords are within the tolerance, with a minimum variation in chordal deviations, the set of sample points 10n is final, and may be used to generate the polyline. If, however, the chords chosen are not within the tolerance, several iterations may be required to provide this is the case and to reduce any variation between chordal deviations to a minimum.

Figure 2A:
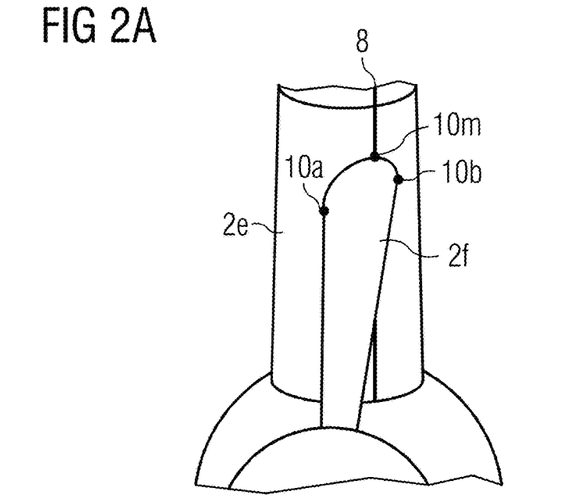
FIG. 2a is a schematic perspective illustration of a rod-rod intersection according to an embodiment.

As a first iteration to determine a final set of sample points to form a polyline, three initial sample points 10m are used, connected by three chords. The sample points 10m are found by intersecting three constant-u lines on one rod 2e with the surface of the other rod 2f. The three sample points 10m may be spaced evenly along the rod-rod intersection 7, and to estimate the u-parameter values that would produce such sample points 10m, the rod-rod intersection 7 is approximated as a circle. With this approximation, the u parameter varies with the sine of s, if s is the position along the rod-rod intersection 7 as a proportion of the intersection curve's length, and the minimum and maximum u-parameter values correspond to the extreme sample points, 10a, 10b, that define the parameter range previously calculated. Because s is difficult to determine, t is used as an approximation of s, where a sample's t value is the sum of the sub-divisions required for all of the chords before the sample point 10m, as a proportion of the sum of all of the sub-divisions required for all of the chords. The number of sub-divisions required for a chord is estimated by taking the square root of the ratio of the chordal deviation (the larger deviation of the chord from the surfaces of the two rods) and the pre-determined tolerance, and may not be a whole number, and may be less than 1.

Figure 2B:
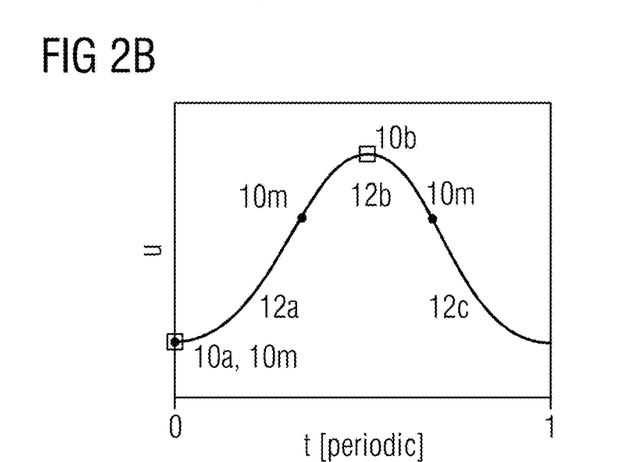
FIG. 2b is a plot used to determine sample parameter values for a rod-rod intersection in a first iteration in a method in accordance with various embodiments.

FIG. 2b is a plot used to determine sample parameter values for a rod-rod intersection in a first iteration in a method in accordance with various embodiments. The first iteration uses three sample points 10m at u parameter values corresponding to $t=0$, $t=\frac{1}{3}$ and $t=\frac{2}{3}$ as shown in FIG. 2b, which uses sine curves to interpolate between the extreme sample points 10a, 10b. After finding the sample points 10m at these u-parameter values, each chord's deviation from the surfaces of the first 2e and second 2f rods is calculated. In order to provide that the chords meet the pre-determined tolerance and to minimize the variation between individual chordal deviations it may be necessary to perform a second iteration that will calculate a new set of sample points 10n. If most or all of the chords from the first iteration do not meet the tolerance, a greater number of sample points 10n and therefore chords is required in the second iteration. If only a small proportion of the chords do not meet the tolerance, using the same number of sample points 10n at new parameter values in the second iteration may be sufficient for the tolerance to be met. For example, based on FIG. 2b, the first chord 12a was determined to require 1.7 divisions, the second chord 12b to require 1.3 divisions, and the third chord 12c to require 2.1, making a total of 5.1. This is rounded up to 6 to provide that on the second iteration, a whole number of samples is used. The t-values of the individual sample points 10m on the graph are then adjusted prior to the next iteration to form a more accurate relationship between t and u, shown in FIG. 2c. Each sample's t-value is the sum of the sub-divisions required for all of the chords before the sample point 10m, as a proportion of the sum of all of the sub-divisions required for all of the chords:

the first sample point remains in its initial position ($t=1.7/5.1=0.33$) and the second sample point moves to the left ($t=[1.7+1.3]/5.1=0.59$).

Figure 2C:
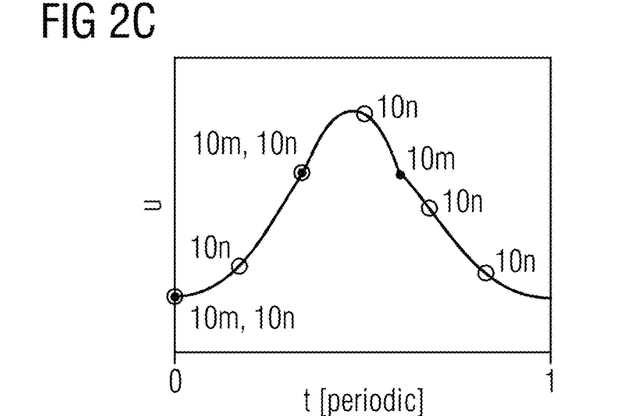
FIG. 2c is a plot used to determine sample parameter values for a rod-rod intersection in a second iteration in a method in accordance with various embodiments.
Figure 3:
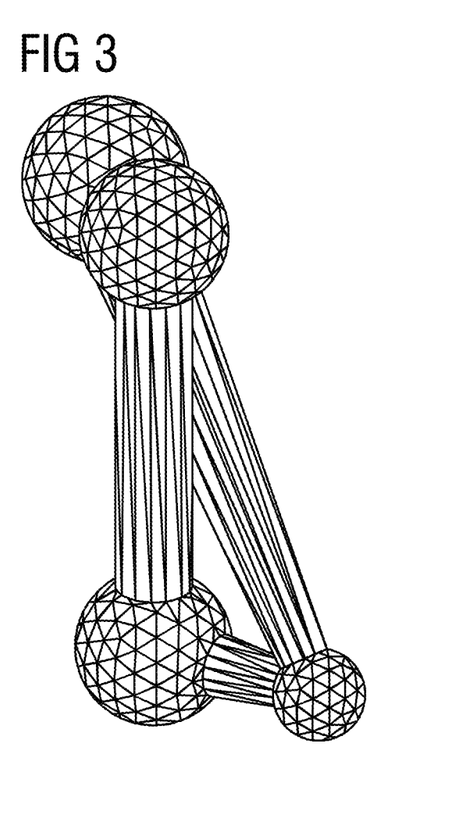
FIG. 3 is a schematic perspective illustration of a mesh representation of the rod-rod intersection of FIG. 1.

FIG. 2c is a plot used to determine sample parameter values for a rod-rod intersection in a second iteration in a method in accordance with various embodiments. FIG. 2c is a refined version of FIG. 2b, which depicts more accurately the relationship between t and u, using measurements from the first iteration, that is used to choose the u-parameter values at which to take samples in a second iteration. This iteration employs six chords and therefore uses six sample points 10n at u-parameter values corresponding to $t=0$, $t=\frac{1}{6}, \ldots t=\frac{5}{6}$, sinusoidally interpolating between the sample points 10m from the first iteration. Again, the chordal deviation is calculated as above, this time resulting in requiring 8 chords, and adjusting the position of the current sample points 10n in the set accordingly, as with the first iteration, creating a third set of sample points 10p. After the third iteration all of the chords satisfy the tolerance, but the largest chordal deviation is 40% higher than the smallest chordal deviation, thus a fourth iteration using eight chords again is required to reduce this difference to 4%. The final, ith, iteration may be one where not only do all of the chords meet the pre-determined tolerance, but the largest chordal deviation is within 10% of the smallest chordal deviation. Once the final iteration is completed, the set of sample points 10i remaining is the final set of sample points. To generate the entire mesh, a number of curves that lie on each rod are generated:

i) Sine-curves/ellipses at lower end of the rod,
ii) Sine-curves/ellipses at upper end of the rod,
iii) Circular arcs at lower end of the rod,
iv) Circular arcs at upper end of the rod, in addition to the non-analytic intersections described above. All five sets of curves are trimmed so that they may be grouped into closed loops and then converted into two-dimensional chords in parameter space for the Delaunay algorithm to be applied. Delaunay triangulation for a given set of P discrete points in a general position is a triangulation DT(P) such that no point P is inside the circumcircle of any triangle in DT(P). Triangles generated using this algorithm are filtered until a mesh representation of each rod and ball of the original self-intersecting lattice is obtained. The mesh representation of FIG. 1 is shown in FIG. 3.

Figure 4:
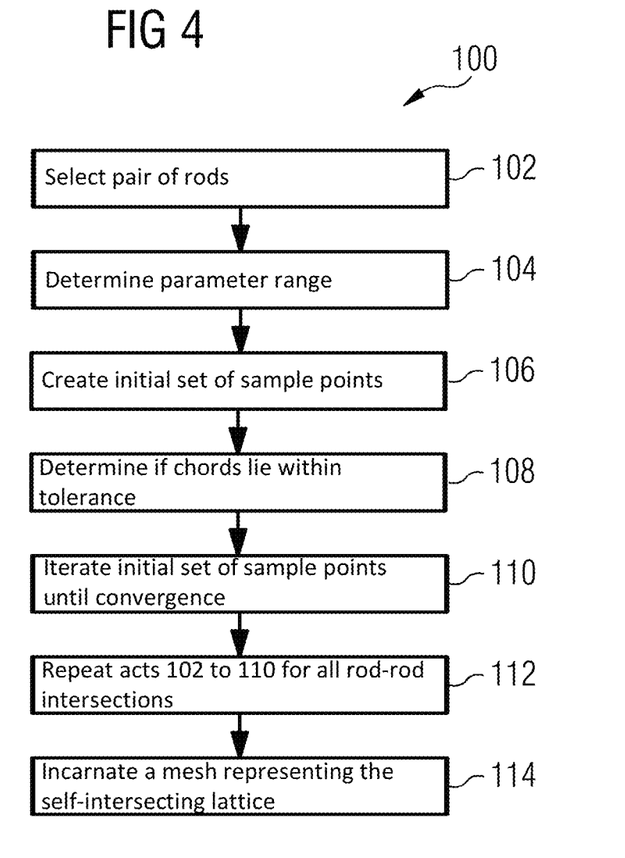
FIG. 4 is a flow chart illustrating methods in accordance with various embodiments.

FIG. 4 is a flow chart illustrating methods in accordance with various embodiments. The method 100 may be carried out on a data-processing system such as that described below with respect to FIG. 7, based on a computer program including code, which when executed by the data-processing system causes it to carry out the following acts. At act 102, a pair of rods 2e, 2f intersecting at a rod-rod intersection 7 of a self-intersecting lattice 1 are selected. To be able to progress to the next acts in the method, the geometry of the bodies (e.g., the pair of rods 2e, 2f) needs to enable the calculation of: i) a constant parameter curve on the surface of the first body, such as the rod 2e, capable of intersection with the surface of the second body, such as the rod 2f, and ii) a parameter range over which the body-body intersection 7 exists. An increase in the speed with which the method works may be achieved if: i) the constant parameter curve on the surface of the first body, rod 2e, is capable of intersection with the surface of the second body, rod 2f, at an analytically determinable point, and ii) the parameter range over which the body-body intersection 7 exists is analytically determinable. Whilst it is possible to calculate the intersection point and the parameter range using numerical methods that iterate until a desired accuracy is achieved, by limiting the body geometries and the constant parameter curve to ones where the intersection point and the parameter range may be determined analytically, iterative numerical methods may be avoided. If these requirements are met, as they are in the conical rods 2e, 2f, then next, at act 104, the parameter range on one body over which the intersection exists is determined. At act 106, an initial set of sample points is created by intersecting a set of constant parameter curves within the parameter range lying on the surface of one of the bodies of the pair with the surface of the other body of the pair. At act 108, whether the chords between adjacent sample points 10m in the initial set of samples lie within a pre-determined tolerance of the surfaces of both rods 2e, 2f in the pair is determined. At this point, during act 110, the initial set of sample points is iterated over until converging on a final set of sample points for which the chords between adjacent sample points meet the pre-determined tolerance.

The chordal deviation may also have an effect on the calculation, as if the chordal deviation exceeds the pre-determined tolerance, then at act 110, the method includes the act of estimating the number of sample sub-points required to sub-divide the chord such that the deviation of each chord sub-division lies within the pre-determined tolerance. This act is optional if on the first iteration, all of the chords chosen met the predetermined tolerance. At act 112, act 102 to 110 are repeated for all of the rod-rod intersections 7 of the self-intersecting lattice 1 At act 114, a mesh representing the self-intersecting lattice is incarnated including a plurality of polylines generated from the final set of sample points for each rod-rod intersection 7.

Within act 110, the current iteration's sample points are used to determine the sample points for the next iteration in order to enable the chords to meet the pre-determined tolerance. As described above, the number of sample points in each successive iteration may remain the same or may increase. In the example above, the largest chordal deviation was required to be within 10% of the smallest chordal deviation within the set of sample points, but any fixed threshold provided by the user may be implemented. The number of iterations required to determine the final set of sample points may be independent of the pre-determined tolerance. Also, the number of calculations required in each iteration in act 110 may be inversely proportional to the square root of the pre-determined tolerance. One main advantage of the embodiments described above is that the sample points in the final set of sample points lie exactly on the self-intersecting lattice.

Figure 5A:
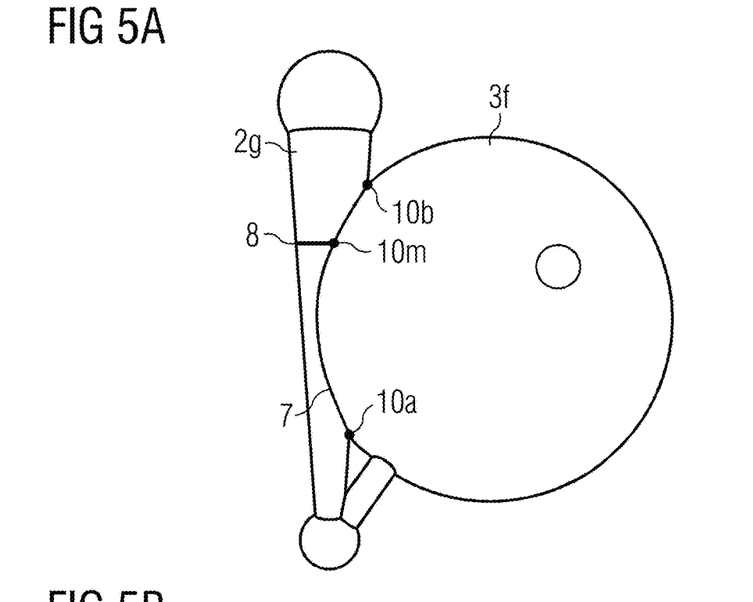
FIG. 5a is a schematic perspective illustration of a rod-ball intersection according to an embodiment.

FIG. 5a is a schematic perspective illustration of a rod-ball intersection. In this example, the body-body intersection is a rod-ball intersection. A ball 3f intersects with a rod 2g at an intersection curve 7. As above, the same technique may be used to generate the polyline representations required for rod-ball intersections. The sample points 10n are found by taking constant parameter curves 8 lying on the rod 2g and intersecting them with the surface of the ball 3f. The curves are taken at various parameters within a parameter range that is calculated analytically as follows. If constant-u parameter curves are being used, and the rod-ball intersection 7 is periodic with respect to the u parameter, then the parameter range is 0 to 2 π radians. Otherwise, the parameter range is given by the two extreme sample points, 10a, 10b, at which the tangent of the rod-ball intersection 7 has zero component in the chosen parameter direction. The choice of a constant-u parameter or a constant-v parameter curve is dependent on the stability of the calculation and the computing time required to solve the analytic intersection points. A pre-determined tolerance is set, that specifies how close the polyline resulting from the set of sample points 10n is to the surfaces of the rod 2g and the ball 3f. Chords are produced by joining the sample points 10n together in order from chosen origin, such as the minimum of the parameter range, based on the parameter of the constant parameter curve. If the chords are within the tolerance, with a minimum variation in chordal deviations, the set of sample points 10n is final, and may be used to generate the polyline. If, however, the chords chosen are not within the tolerance, several iterations may be required to provide this is the case and to reduce any variation between chordal deviations to a minimum.

As a first iteration to determine a final set of sample points to form a polyline, three initial sample points 10m are used, connected by three chords. The sample points 10m are found by intersecting three constant-v circles on the rod 2g with the surface of the ball 3f. The three sample points 10m may be spaced evenly along the rod-ball intersection 7, and to estimate the v-parameter values that would produce such sample points 10m, the rod-ball intersection 7 is approximated as a circle. With this approximation, the v parameter varies with the sine of s, if s is the position along the rod-ball intersection 7 as a proportion of the intersection curve's length, and the minimum and maximum v-parameter values correspond to the extreme sample points, 10a, 10b, that define the parameter range previously calculated. Because s is difficult to determine, t is used as an approximation of s, where a sample's t value is the sum of the sub-divisions required for all of the chords before the sample point 10m, as a proportion of the sum of all of the sub-divisions required for all of the chords. The number of sub-divisions required for a chord is estimated by taking the square root of the ratio of the chordal deviation (the larger deviation of the chord from the surfaces of the rod and the ball) and the pre-determined tolerance, and may not be a whole number, and may be less than 1.

Figure 5B:
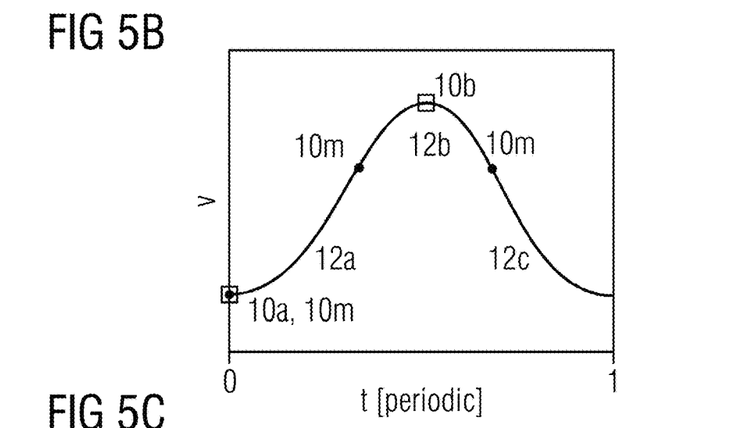
FIG. 5b is a plot used to determine sample parameter values for a rod-ball intersection in a first iteration in a method in accordance with various embodiments.

FIG. 5b is a plot used to determine sample parameter values for a rod-ball intersection in a first iteration in a method in accordance with various embodiments. The first iteration uses three sample points 10m at v parameter values corresponding to $t=0$, $t=\frac{1}{3}$ and $t=\frac{2}{3}$ as shown in FIG. 5b, which uses sine curves to interpolate between the extreme sample points 10a, 10b. After finding the sample points 10m at these v-parameter values, each chord's deviation from the surfaces of the rod 2g and ball 3f is calculated. In order to provide that the chords meet the pre-determined tolerance and to minimize the variation between individual chordal deviations it may be necessary to perform a second iteration that will calculate a new set of sample points 10n. If most or all of the chords from the first iteration do not meet the tolerance, a greater number of sample points 10n and therefore chords is required in the second iteration. If only a small proportion of the chords do not meet the tolerance, using the same number of sample points 10n at new parameter values in the second iteration may be sufficient for the tolerance to be met. For example, based on FIG. 5b, the first chord 12a was determined to require 1.7 divisions, the second chord 12b to require 1.3 divisions, and the third chord 12c to require 2.1, making a total of 5.1. This is rounded up to 6 to provide that on the next iteration, a whole number of samples is used. The t-values of the individual sample points 10m on the graph are then adjusted prior to the next iteration to form a more accurate relationship between t and v, shown in FIG. 5c. Each sample's t-value is the sum of the sub-divisions required for all of the chords before the sample point 10m, as a proportion of the sum of all of the sub-divisions required for all of the chords: the first sample point remains in its initial position (t=1.7/5.1=0.33) and the second sample point moves to the left (t=[1.7+1.3]/5.1=0.59).

Figure 5C:
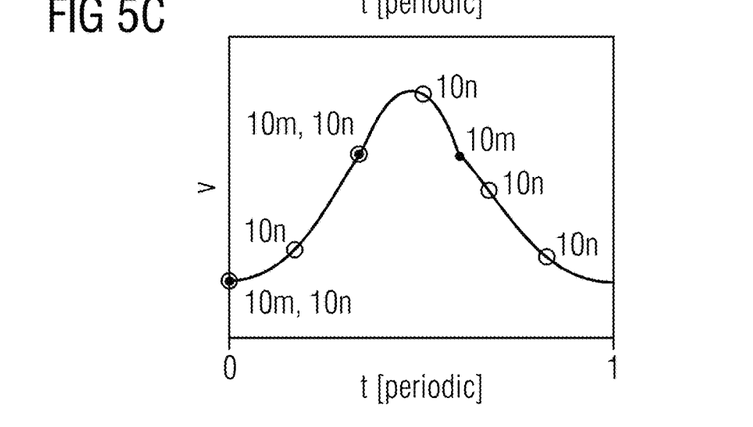
FIG. 5c is a plot used to determine sample parameter values for a rod-ball intersection in a second iteration in a method in accordance with various embodiments.

FIG. 5c is a plot used to determine sample parameter values for a rod-ball intersection in a second iteration in a method in accordance with various embodiments. FIG. 5c is a refined version of FIG. 5b, which depicts more accurately the relationship between t and v, using measurements from the first iteration, that is used to choose the v-parameter values at which to take samples in a second iteration. This iteration employs six chords and therefore uses six sample points $10n$ at v-parameter values corresponding to t=0, t=⅙, ... t=⅚, sinusoidally interpolating between the sample points $10m$ from the first iteration. Again, the chordal deviation is calculated as above, this time resulting in requiring 8 chords, and adjusting the position of the current sample points $10n$ in the set accordingly, as with the first iteration, to create a third set of samples $10p$. After the third iteration all of the chords satisfy the tolerance, but the largest chordal deviation is 40% higher than the smallest chordal deviation, thus a fourth iteration using eight chords again is required to reduce this difference to 4%. The final, ith, iteration may be one where not only do all of the chords meet the pre-determined tolerance, but the largest chordal deviation is within 10% of the smallest chordal deviation. Once the final iteration is completed, the set of sample points $10i$ remaining is the final set of sample points. At this point the mesh may be generated, as described above.

Figure 6:
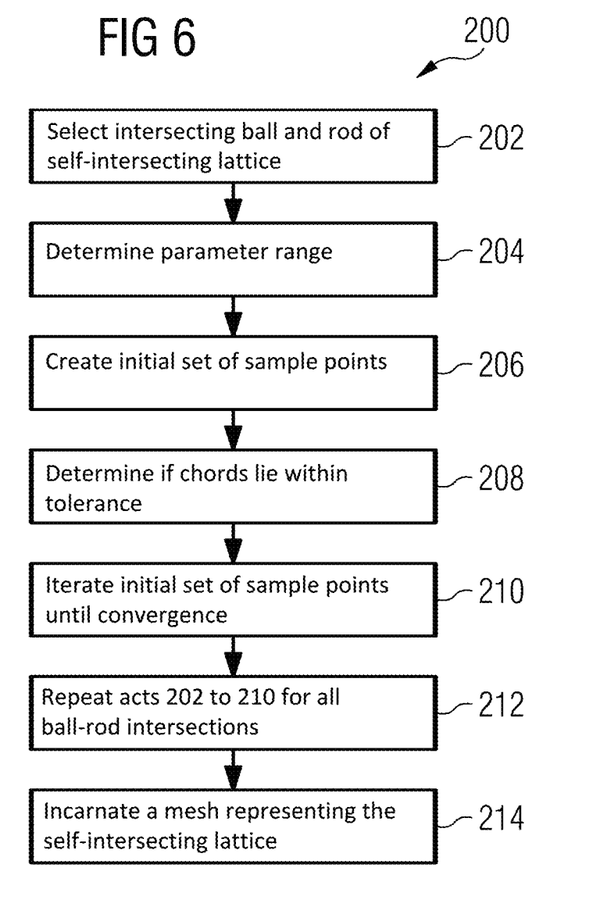
FIG. 6 is a flow chart illustrating methods in accordance with various embodiments.

FIG. 6 is a flow chart illustrating methods in accordance with various embodiments. The method 200 may be carried out on a data-processing system such as that described below with respect to FIG. 7, based on a computer program including code, which when executed by the data-processing system causes it to carry out the following acts. At act 202, a ball $3f$ and a rod $2g$ intersecting at a rod-ball intersection 7 of a self-intersecting lattice 1 are selected. To be able to progress to the next acts in the method, the geometry of the bodies (the rod $2g$ and ball $3f$) needs to enable the calculation of: i) a constant parameter curve on the surface of the first body, such as the rod $2g$, capable of intersection with the surface of the second body, such as the ball $3f$, and ii) a parameter range over which the body-body intersection 7 exists. An increase in the speed with which the method works may be achieved if: i) the constant parameter curve on the surface of the first body, the rod $2g$, is capable of intersection with the surface of the second body, the ball $3f$, at an analytically determinable point, and ii) the parameter range over which the body-body intersection 7 exists is analytically determinable. Whilst it is possible to calculate the intersection point and the parameter range using numerical methods that iterate until a desired accuracy is achieved, by limiting the body geometries and the constant parameter curve to ones where the intersection point and the parameter range may be determined analytically, iterative numerical methods may be avoided. If these requirements are met, as they are in the spherical ball $3f$ and the conical rod $2g$, then next, at act 204, the parameter range on the rod over which the intersection exists is determined. At act 206, an initial set of sample points is created by intersecting a set of constant parameter curves within the parameter range lying on the surface of the rod $2g$ with the surface of the ball $3f$. At act 208, whether the chords between adjacent sample points $10m$ in the initial set of samples lie within a pre-determined tolerance of the surfaces of both bodies $2g$, $3f$ in the pair is determined. At this point, during act 210, the initial set of sample points is iterated over until converging on a final set of sample points for which the chords between adjacent sample points meet the pre-determined tolerance.

The chordal deviation may also have an effect on the calculation, as if the chordal deviation exceeds the pre-determined tolerance, then at act 210, the method also includes the act of estimating the number of sample sub-points required to sub-divide the chord such that the deviation of each chord sub-division lies within the pre-determined tolerance. This act is optional if on the first iteration, all of the chords chosen met the predetermined tolerance. At act 212, acts 202 to 210 are repeated for all of the rod-ball intersections 7 of the self-intersecting lattice 1 Finally, at act 214, a mesh representing the self-intersecting lattice is incarnated including a plurality of polylines generated from the final set of sample points for each rod-ball intersection 7.

Within act 210, the current iteration's sample points are used to determine the sample points for the next iteration in order to enable the chords to meet the pre-determined tolerance. As described above, the number of sample points in each successive iteration may remain the same or may increase. In the example above, the largest chordal deviation was required to be within 10% of the smallest chordal deviation within the set of sample points, but any fixed threshold provided by the user may be implemented. The number of iterations required to determine the final set of sample points may be independent of the pre-determined tolerance. Also, the number of calculations required in each iteration in act 210 may be inversely proportional to the square root of the pre-determined tolerance. One main advantage of the embodiments described above is that the sample points in the final set of sample points lie exactly on the self-intersecting lattice.

In the examples above, the constant parameter curve is determined by the geometries of the bodies. Whilst the bodies themselves have surfaces that are analytic, the intersection curve 7 itself is not necessarily analytic, regardless of whether a rod-rod or rod-ball intersection is examined. One possible issue that may occur is that the process in acts 110 and 210 above may hang if in one iteration using n samples, the resulting chordal deviations require the next iteration to use n+1 samples, and then in a later iteration using n+1 samples, the resulting chordal deviations require the next iteration to use n samples, before repeating the cycle ad infinitum. This may be dealt with by prohibiting the number of samples from decreasing. If, in acts 108, 208 and 110, 210, any chordal deviation exceeds the pre-determined tolerance, the method further includes the act of: estimating the number of sub-divisions required for each chord (which may not be a whole number and may be less than 1) such that the deviation of each chord sub-division lies within the pre-determined tolerance, which influences the next iteration in act 110, 210 as described above. The method includes this same act if, in acts 108, 208 and 110, 210, the maximum chordal deviation is not within a fixed threshold of the minimum chordal deviation within the set of sample points. The total number of sub-divisions required for each chord is used to determine the number of sample points included in the next iteration at act 108, 208. Each chord's number of sub-divisions is used to determine the location of the sample points included in the next iteration at act 108, 208. The number of sample points may be modified or kept the same in each successive iteration.

Figure 7:
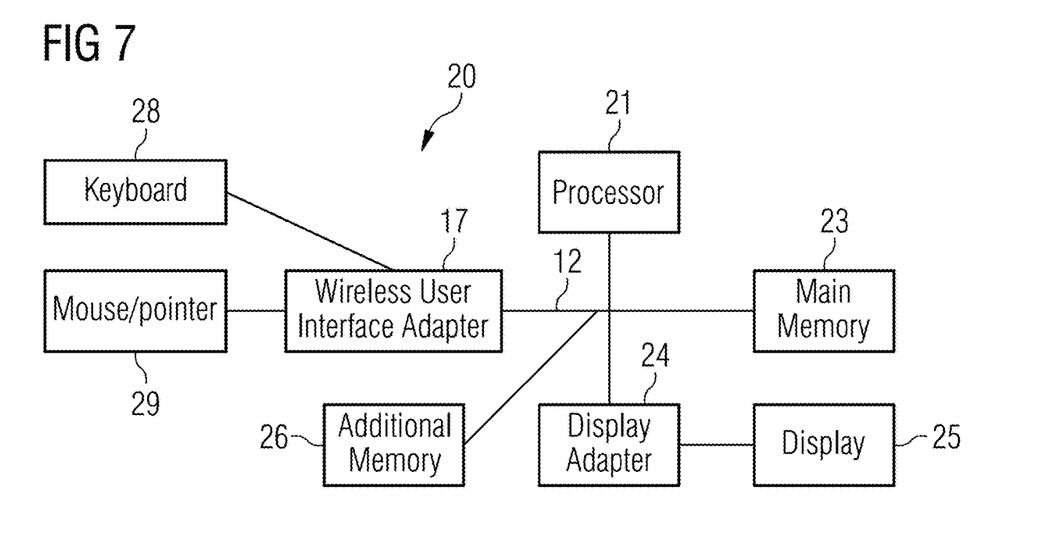
FIG. 7 is a schematic representation of a data-processing system configured to carry out the embodiments.

FIG. 7 illustrates an example of a data processing system in which an embodiment of the present disclosure may be implemented, for example a CAD system configured to perform processes as described herein. The data processing system 20 includes a processor 21 connected to a local system bus 22. The local system bus connects the processor to a main memory 23 and graphics display adaptor 24, which may be connected to a display 25. The data processing system may communicate with other systems via a wireless user interface adapter connected to the local system bus 22, or via a wired network, for example, to a local area network. Additional memory 16 may also be connected via the local system bus. A suitable adaptor, such as wireless user interface adapter 27, for other peripheral devices, such as a keyboard 28 and mouse 29, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further, it should be appreciated that many devices referred to as input devices or output devices may both provide inputs and receive outputs of communications with the data processing system. Further, it should be appreciated that other peripheral hardware connected to the I/O controllers may include any type of device, machine, or component that is configured to communicate with a data processing system.

An operating system included in the data processing system enables an output from the system to be displayed to the user on display 25 and the user to interact with the system. Examples of operating systems that may be used in a data processing system may include Microsoft Windows™, Linux™, UNIX™, iOS™, and Android™ operating systems.

In addition, it should be appreciated that data processing system 20 may be implemented as in a networked environment, distributed system environment, virtual machines in a virtual machine architecture, and/or cloud environment. For example, the processor 11 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 20 may vary for particular implementations. For example, the data processing system 20 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 20 may be connected to the network (not a part of data processing system 20), which may be any public or private data processing system network or combination of networks, as known to those of skill in the art, including the Internet. Data processing system 20 may communicate over the network with one or more other data processing systems such as a server (also not part of the data processing system 20). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of incarnating a three-dimensional (3D) self-intersecting lattice structure as a 3D mesh in a 3D model, the method comprising:
   a) selecting, by at least one processor of a data processing system, an ordered pair of intersecting 3D bodies at a body-body intersection within the 3D self-intersecting lattice structure, wherein a geometry of the ordered pair of intersecting 3D bodies enables a calculation of: a constant parameter curve on a surface of a first 3D body capable of intersection with a surface of a second 3D body, and a parameter range over which the body-body intersection exists;
   b) determining, by the at least one processor, the parameter range on the first 3D body of the ordered pair of intersecting 3D bodies over which the body-body intersection exists;
   c) creating, by the at least one processor, an initial set of sample points by intersecting a set of constant parameter curves within the parameter range lying on the surface of the first 3D body of the ordered pair of intersecting 3D bodies with the surface of the second 3D body of the ordered pair of intersecting 3D bodies;
   d) determining, by the at least one processor, whether chords between adjacent sample points in the initial set of sample points lie within a pre-determined tolerance of the surfaces of both 3D bodies in the ordered pair of intersecting 3D bodies;
   e) iterating, by the at least one processor, over the initial set of sample points and allowing a number of sample points to increase, until converging on a final set of sample points for which the chords between the adjacent sample points meet the pre-determined tolerance;

f) repeating, by the at least one processor, acts a) to e) for all body-body intersections of the 3D self-intersecting lattice structure; and g) incarnating, by the at least one processor, the 3D mesh representing the 3D self-intersecting lattice structure including a plurality of polylines generated from the final set of sample points for each respective body-body intersection of all the body-body intersections.

2. The method of claim 1, wherein the first 3D body in the ordered pair of intersecting 3D bodies is a rod and the second 3D body in the ordered pair of intersecting 3D bodies is a ball, and wherein the body-body intersection is a rod-ball intersection.

3. The method of claim 1, wherein the first 3D body in the ordered pair of intersecting 3D bodies is a rod and the second 3D body in the ordered pair of intersecting 3D bodies is a rod, and wherein the body-body intersection is a rod-rod intersection.

4. The method of claim 1, wherein the constant parameter curve is a constant-u parameter curve or a constant-v parameter curve.

5. The method of claim 1, wherein, when any chordal deviation exceeds the pre-determined tolerance, the method further comprises:

estimating, by the at least one processor, a number of sub-divisions required for each respective chord of the chords such that the chordal deviation of each respective chord sub-division lies within the pre-determined tolerance;

determining, by the at least one processor, the number of sample points included in a next iteration of act e) using a total value of the sub-divisions; and determining, by the at least one processor, a location of the sample points included in the next iteration of act e) using individual values of the sub-divisions.

6. The method of claim 1, wherein the number of sample points is prohibited from decreasing in each successive iteration at act e).

7. The method of claim 1, wherein a maximum chordal deviation is within a fixed threshold of a minimum chordal deviation within the set of sample points.

8. The method of claim 1, wherein sample points in the final set of sample points lie exactly on the 3D self-intersecting lattice structure.

9. The method of claim 1, wherein the body-body intersection is a non-analytic curve.

10. The method of claim 1, wherein the constant parameter curve on the surface of the first 3D body is capable of intersection with the surface of the second 3D body at an analytically determinable point.

11. The method of claim 1, wherein the parameter range over which the body-body intersection exists is analytically determinable.

12. A data processing system comprising:
at least one processor configured to:
  a) select an ordered pair of intersecting three-dimensional (3D) bodies at a body-body intersection within a 3D self-intersecting lattice, wherein a geometry of the ordered pair of intersecting 3D bodies enables a calculation of: a constant parameter curve on a surface of a first 3D body capable of intersection with a surface of a second 3D body, and a parameter range over which the body-body intersection exists;
  b) determine the parameter range on the first 3D body of the ordered pair over of intersecting 3D bodies which the body-body intersection exists;
  c) create an initial set of sample points by intersecting a set of constant parameter curves within the parameter range lying on the surface of the first body of the ordered pair of intersecting 3D bodies with the surface of the second 3D body of the ordered pair of intersecting 3D bodies;
  d) determine whether chords between adjacent sample points in the initial set of sample points lie within a pre-determined tolerance of the surfaces of both 3D bodies in the ordered pair of intersecting 3D bodies;
  e) iterate over the initial set of sample points and allowing a number of sample points to increase, until converging on a final set of sample points for which the chords between the adjacent sample points meet the pre-determined tolerance;
  f) repeat acts a) to e) for all body-body intersections of the 3D self-intersecting lattice; and
  g) incarnate a 3D mesh representing the 3D self-intersecting lattice including a plurality of polylines generated from the final set of sample points for each respective body-body intersection of all the body-body intersections.

13. The method of claim 1, further comprising:
displaying, by a display of the data processing system, the 3D mesh; and/or
storing, by a memory of the data processing system, the 3D mesh.

* * * * *